US012414082B2

(12) United States Patent
Zheng et al.

(10) Patent No.: US 12,414,082 B2
(45) Date of Patent: Sep. 9, 2025

(54) RESOURCE CONFLICT PROCESSING METHOD AND DEVICE

(71) Applicant: VIVO MOBILE COMMUNICATION CO.,LTD., Guangdong (CN)

(72) Inventors: Qian Zheng, Guangdong (CN); Xiaodong Yang, Guangdong (CN); Jing Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 377 days.

(21) Appl. No.: 17/498,935

(22) Filed: Oct. 12, 2021

(65) Prior Publication Data

US 2022/0030556 A1 Jan. 27, 2022

Related U.S. Application Data

(63) Continuation of application No. PCT/CN2020/086409, filed on Apr. 23, 2020.

(30) Foreign Application Priority Data

Apr. 23, 2019 (CN) .......................... 201910330787.0

(51) Int. Cl.
*H04W 72/02* (2009.01)
(52) U.S. Cl.
CPC .................................. *H04W 72/02* (2013.01)
(58) Field of Classification Search
None
See application file for complete search history.

(56) References Cited

U.S. PATENT DOCUMENTS

| 2018/0115873 | A1 | 4/2018 | Aminaka |
| 2019/0174545 | A1 | 6/2019 | Li et al. |
| 2019/0246418 | A1* | 8/2019 | Loehr ................... H04W 72/21 |
| 2019/0334678 | A1 | 10/2019 | Liu et al. |
| 2019/0363831 | A1 | 11/2019 | Davydov et al. |
| 2020/0383088 | A1 | 12/2020 | Min et al. |

(Continued)

FOREIGN PATENT DOCUMENTS

| CN | 107659965 A | 2/2018 |
| CN | 108243497 A | 7/2018 |

(Continued)

OTHER PUBLICATIONS

Ericsson, Radio Resource Pool Sharing Between Mode 3 and Mode 4 UEs, Agenda Item 6.2.3.1.3, Doc No. R1-1708942, dated May 2017. (Year: 2017).*

CATT, "Discussion on Resource Pool Sharing Between Mode 3 and Mode 4", Agenda Item 6.2.3.1.3, Doc No. R1-1707450, dated May 2017 (Year: 2017).*

(Continued)

*Primary Examiner* — Jamaal Henson
(74) *Attorney, Agent, or Firm* — Price Heneveld LLP

(57) ABSTRACT

An embodiment of the present disclosure provides a processing method and device. The method includes: discarding a first resource when the first resource conflicts with a second resource; and transmitting first information to a network device, wherein the first information indicates that a terminal discards the first resource and/or a reason why the terminal discards the first resource, the first resource is a resource acquired by the terminal based on a network device scheduling mode, and the second resource is a resource acquired by the terminal based on a terminal autonomous selection mode.

20 Claims, 4 Drawing Sheets

(56) References Cited

U.S. PATENT DOCUMENTS

| | | | |
|---|---|---|---|
| 2021/0258980 A1* | 8/2021 | Luo | H04W 76/14 |
| 2022/0061055 A1* | 2/2022 | Freda | H04W 72/1263 |
| 2022/0070876 A1* | 3/2022 | Bangolae | H04W 4/40 |

FOREIGN PATENT DOCUMENTS

| | | |
|---|---|---|
| CN | 108886769 A | 11/2018 |
| CN | 109392167 A | 2/2019 |
| CN | 109565680 A | 4/2019 |
| CN | 110100491 A | 8/2019 |
| EP | 3651519 A1 | 5/2020 |
| KR | 20190017632 A | 2/2019 |
| WO | 2010085095 A2 | 7/2010 |
| WO | 2014176972 A1 | 11/2014 |
| WO | 2018094618 A1 | 5/2018 |
| WO | 2018191916 A1 | 10/2018 |

OTHER PUBLICATIONS

CATT, "Discussion on mode 3 and mode 4 shared resource pool", 3GPP TSG-RAN WG2 #101, R2-1802115, Athens, Greece, Feb. 26-Mar. 2, 2018.

Nokia, "Summary of Tuesday offline discussion on PUSCH enhancements for NR eURLLC (AI 7.2.6.3)", 3GPP TSG-RAN WG1 Meeting #96bis, R1-1905702, Xi'an, China, Apr. 8-12, 2019.

Ericsson, "On Pools Overlap for Mode 1 and Mode 2", 3GPP TSG RAN WG1 Meeting #86, R1-166975, Gothenburg, Sweden, Aug. 22-26, 2016.

CATT, "Discussion on mode 3 and mode 4 shared resource pool", 3GPP TSG-RAN WG2 #99, R2-1708053, Berlin, Germany, Aug. 21-25, 2017.

VIVO, "In-device coexistence between NR and LTE sidelinks", 3GPP TSG RAN WG1 Meeting #96bis, R1-1904076, Xi'an, China, Apr. 8-12, 2019.

* cited by examiner

RESOURCE CONFLICT PROCESSING METHOD AND DEVICE

CROSS-REFERENCE TO RELATED APPLICATION

This application is a continuation application of International Application No. PCT/CN2020/086409 filed on Apr. 23, 2020, which claims priority to Chinese Patent Application No. 201910330787.0 filed in China on Apr. 23, 2019, which are incorporated herein by reference in their entireties.

TECHNICAL FIELD

An embodiment of the present disclosure relates to the technical field of communication, and in particular, to a processing method and device.

BACKGROUND

For a long term evolution (LTE) system, it only supports that each terminal (for example, user equipment, UE) works in a single resource allocation mode (that is, a network device scheduling mode or a terminal autonomous selection mode). For a new radio (NR) system, since it is necessary to support more diverse quality of service (QoS) services, it is hoped that the system can be enhanced as that each terminal may operate in the network device scheduling mode and the terminal autonomous selection mode at the same time.

In a case that the terminal works in the network device scheduling mode (or called a mode 1) and the terminal autonomous selection mode (or called a mode 2) at the same time, when a resource acquired by the terminal based on the mode 1 conflicts with a resource acquired by the terminal based on the mode 2, how to deal will the resource conflict situation is an urgent problem to be solved.

SUMMARY

According to a first aspect, some embodiments of the present disclosure provide a processing method, applied to a terminal. The processing method includes:

discarding a first resource when the first resource conflicts with a second resource; and transmitting first information to a network device, wherein the first information indicates that the terminal discards the first resource and/or a reason why the terminal discards the first resource, the first resource is a resource acquired by the terminal based on a network device scheduling mode, and the second resource is a resource acquired by the terminal based on a terminal autonomous selection mode.

According to a second aspect, some embodiments of the present disclosure further provide a processing method, applied to a network device. The processing method includes:

receiving first information from a terminal, wherein the first information indicates that the terminal discards a first resource and/or a reason which the terminal discards the first resource, and the first resource is a resource acquired by the terminal based on a network device scheduling mode.

According to a third aspect, some embodiments of the present disclosure further provide a terminal, including:

a processing module, configured to discard a first resource when the first resource conflicts with a second resource; and a transmitting module, configured to transmit first information to a network device, wherein the first information indicates that the terminal discards the first resource and/or a reason why the terminal discards the first resource, the first resource is a resource acquired by the terminal based on a network device scheduling mode, and the second resource is a resource acquired by the terminal based on a terminal autonomous selection mode.

According to a fourth aspect, some embodiments of the present disclosure further provide a network device, including:

a receiving module, configured to receive first information from a terminal, wherein the first information indicates that the terminal discards a first resource and/or a reason which the terminal discards the first resource, and the first resource is a resource acquired by the terminal based on a network device scheduling mode.

According to a fifth aspect, some embodiments of the present disclosure further provide a terminal, including: a processor, a memory, and a program stored in the memory and capable of running on the processor, wherein when the program is executed by the processor, the steps of the processing method as defined in the first aspect are implemented.

According to a sixth aspect, some embodiments of the present disclosure further provide a network device, including: a processor, a memory, and a program stored in the memory and capable of running on the processor, wherein when the program is executed by the processor, the steps of the processing method as defined in the second aspect are implemented.

According to a seventh aspect, some embodiments of the present disclosure further provide a computer readable storage medium, wherein the computer readable storage medium stores a computer program; and when the computer program is executed by the processor, the steps of the processing method as defined in the first aspect or the second aspect are implemented.

BRIEF DESCRIPTION OF DRAWINGS

With reference to detailed descriptions in preferable implementations in the following descriptions, various other advantages and benefits become clear to a person of ordinary skills in the art. The accompanying drawings are merely used to show the preferred implementations, and are not considered as limitations to the present disclosure. In addition, in all the accompanying drawings, same reference numerals are used to indicate the same component. In the accompanying drawings.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments made on the basis of the embodiments of the present disclosure by a person of ordinary skill in the art shall be included in the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: only A exists, only B exists, and both A and B exist.

In some embodiments of the present disclosure, the word such as "exemplary" or "for example" is used to represent giving an example, an illustration, or a description. Any embodiment or design scheme described as "exemplary" or "for example" in some embodiments of the present disclosure should not be explained as being more preferred or having more advantages than other embodiments or design schemes. Exactly, use of the term "exemplary" or "for example" is intended to present a relevant concept in a specific manner.

Figure 1:
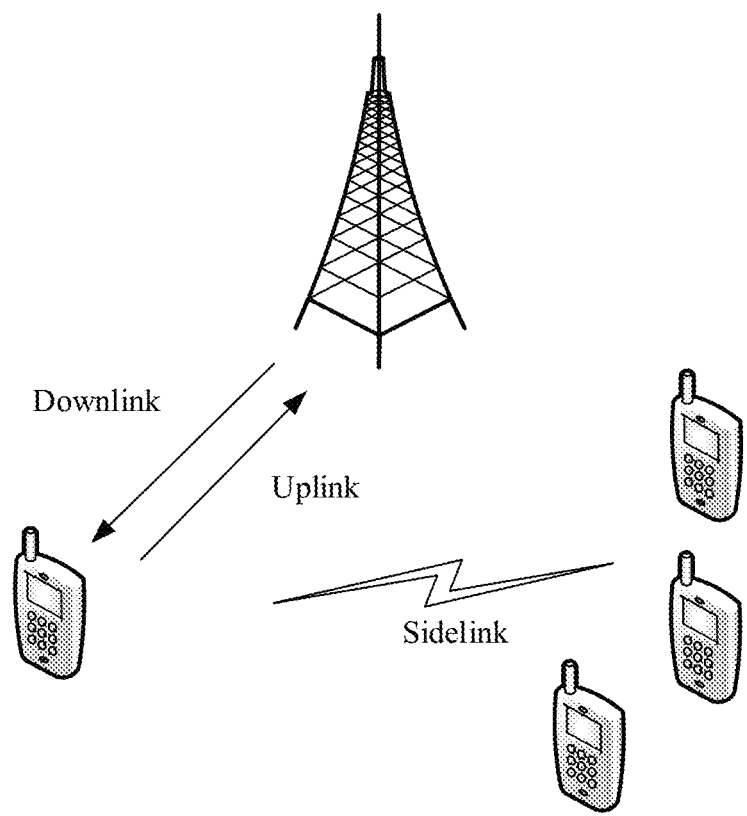
FIG. 1 is a schematic diagram of an LTE uplink/downlink/sidelink.

To better understand the embodiments of the present disclosure, the following technical points are first described:

1. For a sidelink (SL):

The LTE system starts to support Sidelink from the 12th release version, for directly performing data transmission between UE not through a network device, referring to FIG. 1.

The design of the LTE sidelink is suitable for specific public safety affairs (such as emergency communication in a fire disaster place or an earthquake disaster place), or vehicle to everything (V2X) communication. The V2X communication includes various services, for example, basic safety communication, advanced (automatic) driving, formation, sensor extension, and the like. Because the LTE sidelink only supports broadcast communication, the LTE sidelink is mainly used for basic safety communication. Other advanced V2X services with a strict QoS requirement in terms of delay and reliability are supported by an NR sidelink.

The fifth generation (5-th Generation, 5G) NR system may be used in an operating band above 6 GHz that LTE does not support, and supports a higher operating bandwidth. However, the NR system only supports only an interface between a base station and a terminal, and does not support a sidelink interface for direct communication between terminals.

2. For the transmission form of Sidelink:

The sidelink transmission is mainly divided into several transmission forms, such as broadcast, groupcast and unicast. Unicast, as its name implies, is one to one transmission. Multicast is one to many transmission. Broadcast is also one to many transmission, but there is no concept that the SL belongs to a same group.

The sidelink unicast and groupcast communication supports physical layer HARQ feedback mechanism. A transmitting terminal UE determines whether there is a Sidelink retransmission request according to hybrid automatic repeat request (HARQ) acknowledge (ACK) information/non-acknowledge (NACK) information fed back by a receiving terminal UE.

3. For a resource allocation mode:

The resource allocation mode of the Sidelink UE is totally divided into two types:

1) a network device scheduling mode (Mode 1): controlled by a network side device (base station) and allocating a resource for each piece of UE; and 2) a terminal autonomous selection mode (Mode 2): autonomously selecting a resource by each piece of UE.

The technology described in this specification is not limited to the 5th-generation (5G) system and subsequent evolved communication systems as well as LTE/LTE-advanced (LTE-A) systems, and may also be applied to various wireless communication systems such as code division multiple access (CDMA), time division multiple access (TDMA), frequency division multiple access (FDMA), orthogonal frequency division multiple access (OFDMA), and single-carrier frequency-division multiple access (SC-FDMA) systems, and other systems.

The terms "system" and "network" are usually used interchangeably. A CDMA system may implement radio technologies such as CDMA2000, universal terrestrial radio access (UTRA) and the like. UTRA includes wideband CDMA (WCDMA) and other CDMA variants. A TDMA system may implement radio technologies such as a global system for mobile communication (GSM) and the like. An OFDMA system may implement radio technologies such as ultra mobile broadband (Ultra Mobile Broadband, UMB), evolved-UTRA (E-UTRA), IEEE802.11 (Wi-Fi), IEEE 802.16 (WiMAX), IEEE 802.20, Flash-OFDM and the like. UTRA and E-UTRA are parts of a universal mobile telecommunications system (UMTS). LTE and more advanced LTE (such as LTE-A) are new UMTS versions that use E-UTRA. UTRA, E-UTRA, UMTS, LTE, LTE-A and GSM are described in documents from an organization named "3rd generation partnership project (3GPP)". CDMA2000 and UMB are described in a document from an origination named "3rd Generation Partnership Project 2" (3GPP2). The technology described herein may be used in the above-mentioned systems and radio technologies as well as other systems and radio technologies.

A terminal provided by some embodiments of the present disclosure may be a mobile phone, a tablet computer, a notebook computer, an ultra-mobile personal computer (UMPC), a netbook or a personal digital assistant (PDA), a mobile Internet device (MID), a wearable device, a vehicle-mounted device, or the like.

A network device provided by some embodiments of the present disclosure may be a base station. The base station may be a commonly used base station, or an evolved node base station (eNB), or a network device (for example, a next generation node base station next generation node base station, gNB) in a 5G system or a transmission and reception point (TRP), or the like.

Figure 2:
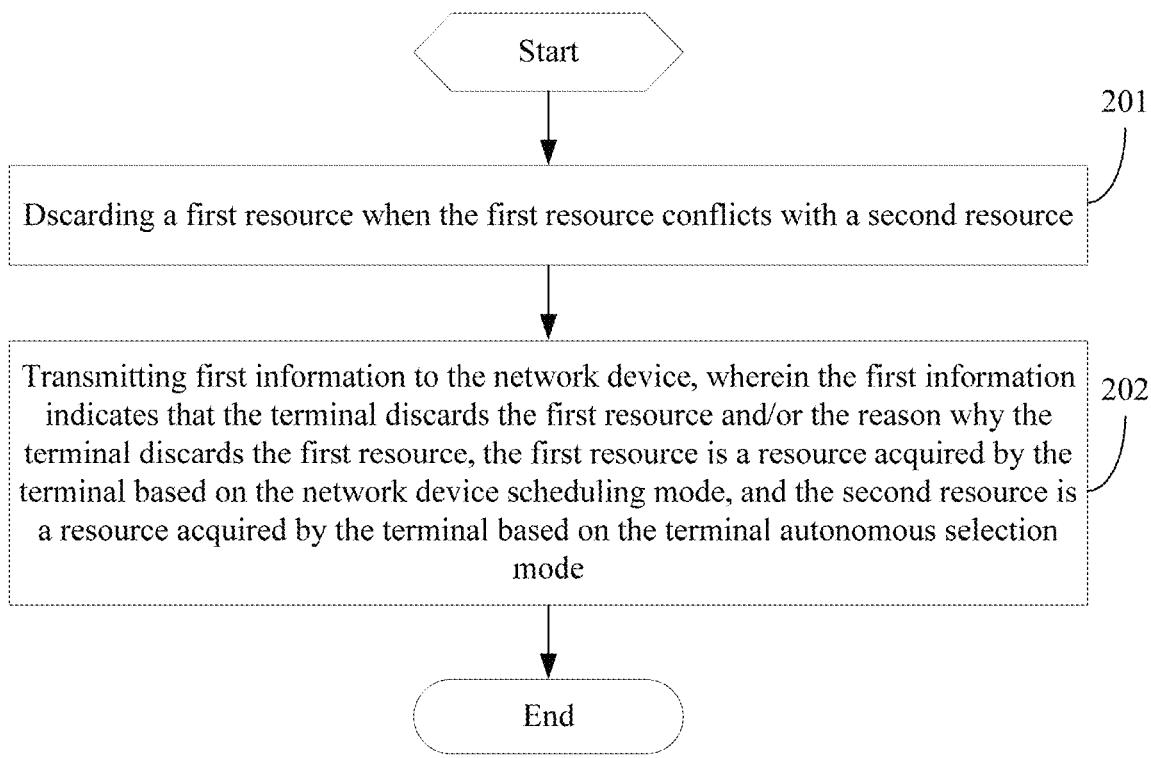
FIG. 2 is a first flowchart of a processing method according to some embodiments of the present disclosure.

Referring to FIG. 2, some embodiments of the present disclosure provide a processing method. The method may be performed by a terminal. The terminal may have SideLink capability. The terminal may be SideLink UE. The method includes a step 201 and a step 202, specifically as follows:

Step 201: discarding a first resource when the first resource conflicts with a second resource.

In some embodiments of the present disclosure, a part where the first resource conflicts with the second resource may be called a conflict resource.

Step 202: transmitting first information to a network device, wherein the first information indicates that the terminal discards the first resource and/or a reason why the terminal discards the first resource, the first resource is a resource acquired by the terminal based on a network device scheduling mode, and the second resource is a resource acquired by the terminal based on a terminal autonomous selection mode.

Exemplarily, the reason why the terminal discards the first resource may be that the first resource conflicts with the second resource.

In some embodiments of the present disclosure, optionally, before the step of discarding the first resource, the method may further include: receiving second information from the network device, wherein the second information indicates the terminal to operate in the network device scheduling mode and the terminal autonomous selection mode at the same time.

In some embodiments of the present disclosure, optionally, after the step of transmitting the first information to the network device, the method may further include: receiving third information from the network device, wherein the third information is used to reconfigure that the terminal works in the network device scheduling mode or the terminal autonomous selection mode, or the third information is used to reconfigure a resource of the terminal working in the network device scheduling mode.

In some embodiments of the present disclosure, optionally, the step of transmitting the first information to the network device includes: transmitting the first information to the network device through a predefined signaling and/or a dedicated resource.

In some embodiments of the present disclosure, optionally, the format of the predefined signaling may be any one of the followings:

(1) a physical uplink control channel (PUCCH) format;

(2) a medium access control control element (MAC CE) format; or (3) a radio resource control (RRC) format.

In some embodiments of the present disclosure, optionally, in a case that the format of the predefined signaling is the MAC CE format, the predefined signaling may further include: a logical channel identifier (LCID), wherein the LCID is used to identify the MAC CE format.

In some embodiments of the present disclosure, optionally, the dedicated resource may be a resource of a scheduling request (SR).

In some embodiment of the present disclosure, optionally, the first operation may include at least one of the followings:

(1) a grant type of the first resource (Grant type), for example: a dynamic grant, a configured grant type 1, and a configured grant type 2;

(2) fourth information, the fourth information indicating the first resource for retransmission or new transmission;

(3) a hybrid automatic repeat request (HARQ) process identifier, which may be short for an HARQ process ID;

(4) a destination identifier (Destination ID);

(5) a destination user equipment identifier (Destination UE ID);

(6) a destination group identifier (Destination Group ID), wherein exemplarily, for UE1, it is necessary to perform Sidelink communication with UE2, UE3 and UE4, a resource for communicating UE1 with UE2 and UE3 is based on the mode 1, a resource for communicating UE1 with UE4 is based on the mode 2, and assuming that the mode 1 and mode 2 resources of the UE1 conflict with each other, the base station needs to know which resource allocated to the UE (UE2 or UE3 or "UE1 and UE2") conflicts with the mode 2 resource; and (7) time-frequency information of a conflict resource.

In some embodiments of the present disclosure, optionally, in a case that the grant type of the first resource is a configured grant, the first information may further include: a configured grant index of the first resource.

In some embodiment of the present disclosure, optionally, the time-frequency information may include at least one of the followings:

(1) a duration of the conflict resource;

(2) a time-domain position of the conflict resource, for example: a radio frame, a subframe, a slot and a symbol number;

(3) a frequency-domain position of the conflict resource, for example: a sidelink carrier, a band width part (BWP) and a subchannel number; or (4) a resource pool identifier of the conflict resource.

In some embodiments of the present disclosure, when the resource acquired by the terminal based on the network device scheduling mode conflicts with the resource acquired by the terminal based on the terminal autonomous selection mode, the terminal may discard the resource acquired by the network device scheduling mode and informs the network device, so that the network device can timely deal with and avoid the subsequent resource conflict, and the scheduling performance of the network device can be ensured.

Figure 3:
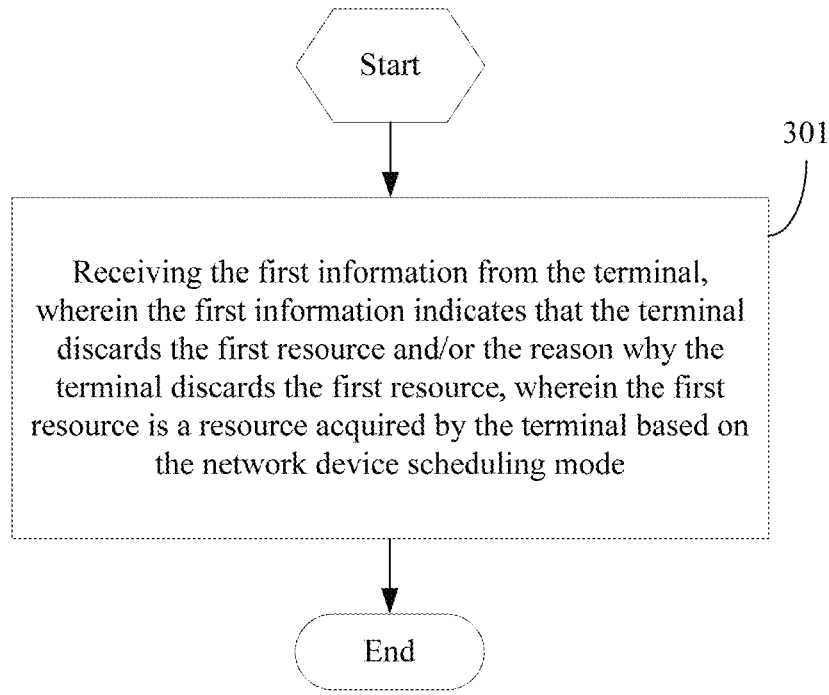
FIG. 3 is a second flowchart of a processing method according to some embodiments of the present disclosure.

Referring to FIG. 3, some embodiments of the present disclosure provides a processing method. The method is performed by the network device and includes a step 301, specifically as follows:

Step 301: receiving first information from the terminal, wherein the first information indicates that the terminal discards a first resource and/or a reason why the terminal discards the first resource, and the first resource is a resource acquired by the terminal based on the network device scheduling mode.

Exemplarily, the reason why the terminal discards the first resource may be that the first resource conflicts and the second resource, wherein the second resource is a resource acquired by the terminal based on the terminal autonomous selection mode.

In some embodiments of the present disclosure, the terminal may have Sidelink capability. The terminal may be SideLink UE.

In some embodiments of the present disclosure, optionally, before the step of receiving the first information from the terminal, the method further includes:

transmitting second information to the terminal, wherein the second information indicates the terminal to operate in the network device scheduling mode and the terminal autonomous selection mode at the same time.

In some embodiments of the present disclosure, optionally, after the step of receiving the first information from the terminal, the method further includes:

transmitting third information to the terminal, wherein the third information is used to reconfigure that the terminal works in the network device scheduling mode or the terminal autonomous selection mode, or the third information is used to reconfigure a resource of the terminal working in the network device scheduling mode.

In some embodiments of the present disclosure, optionally, the step of receiving the first information from the terminal includes: receiving the first information from the terminal through a predefined signaling and/or a dedicated resource.

In some embodiments of the present disclosure, optionally, the format of the predefined signaling may be any one of the followings:
(1) a PUCCH format;
(2) an MAC CE format; or
(3) an RRC format.

In some embodiments of the present disclosure, optionally, when the format of the predefined signaling is the MAC CE format, the predefined signaling further includes: an LCID, wherein the LCID is used to identify the MAC CE format.

In some embodiments of the present disclosure, optionally, the dedicated resource may be a resource of an SR.

In some embodiment of the present disclosure, optionally, the first operation may include at least one of the followings:
(1) a grant type of the first resource,
for example: a dynamic grant, a configured grant type 1, and a configured grant type 2;
(2) fourth information, the fourth information indicating the first resource for retransmission or new transmission;
(3) an HARQ process ID;
(4) a Destination ID;
(5) a Destination UE ID;
(6) a Destination Group ID; or
(7) time-frequency information of a conflict resource.

In some embodiment of the present disclosure, optionally, in a case that the grant type of the first resource is a configured grant, the first information may further include: a configured grant index of the first resource.

In some embodiment of the present disclosure, optionally, the time-frequency information may include at least one of the followings:
(1) a duration of the conflict resource;
(2) a time-domain position of the conflict resource, for example: a radio frame, a subframe, a slot and a symbol number;
(3) a frequency-domain position of the conflict resource, for example: a Sidelink carrier, BWP and a subchannel number; or
(4) a resource pool identifier of the conflict resource.

In some embodiments of the present disclosure, when the resource acquired by the terminal based on the network device scheduling mode conflicts with the resource acquired by the terminal based on the terminal autonomous selection mode, the terminal may discard the resource acquired by the network device scheduling mode and informs the network device, so that the network device can timely deal with and avoid the subsequent resource conflict, and the scheduling performance of the network device can be ensured.

The processing flow of some embodiments of the present disclosure is described below by taking the case where the terminal is UE and the network device is a base station as an example.

Step 1: the UE is configured by the base station to operate in the network device scheduling mode (mode 1) and the terminal autonomous selection mode (mode 2) at the same time.

Step 2: when the resource acquired by the UE based on the mode 1 conflicts with the resource acquired by the UE based on the mode 2, the resource acquired by the current mode 1 is discarded.

Step 3: the UE informs the resource information of the discarded resource acquired by the mode 1 to the base station.

Optionally, the resource information may include:
(1) a grant type, wherein the grant type includes: a dynamic grant, a configured grant type 1, and a configured grant type 2,
wherein further, if the grant type is the configured grant, the discarded configured grant index may be informed;
(2) indication for distinguishing retransmission or new transmission;
(3) an HARQ process ID;
(4) a Destination ID;
(5) a Destination UE ID;
(6) a Destination Group ID; and
(7) time-frequency information of a conflict resource, including a duration, a specific time-domain position (for example: a radio frame, a subframe, a slot and a symbol number), a specific frequency-domain position (for example: a Sidelink carrier, BWP and a subchannel number), and a resource pool number.

Optionally, resource information in the step 3 is carried through a dedicated signaling and/or a dedicated resource, for example:
(a) configuring an SR dedicated resource notification;
(b) reporting by a PUCCH format, for example, enhancing an SR format or introducing a new format;
(c) reporting by MAC CE;
further, if it is MAC CE, it is also necessary to introduce a new logical channel identifier (LCID) for identify the MAC CE format; and
(d) informing through an RRC dedicated signaling.

Step 4: after receiving the indication that the UE discards the mode 1 resource information, the base station may adopt at least one of the following operations:
(1) reconfiguring that the UE works in a single mode, that is, in a mode 1 or a mode 2; or
(2) reconfiguring a resource of the UE working in the mode 1, mainly for periodic services and the situation that the type of the mode 1 resource acquired by the UE is the configured grant.

Some embodiments of the present disclosure further provide a terminal. The principle of solving the problem by the terminal is similar to the processing method in some embodiments of the present disclosure, so the implementation of the terminal may be referenced to the implementation of the method. Repetitions are not provided herein.

Figure 4:
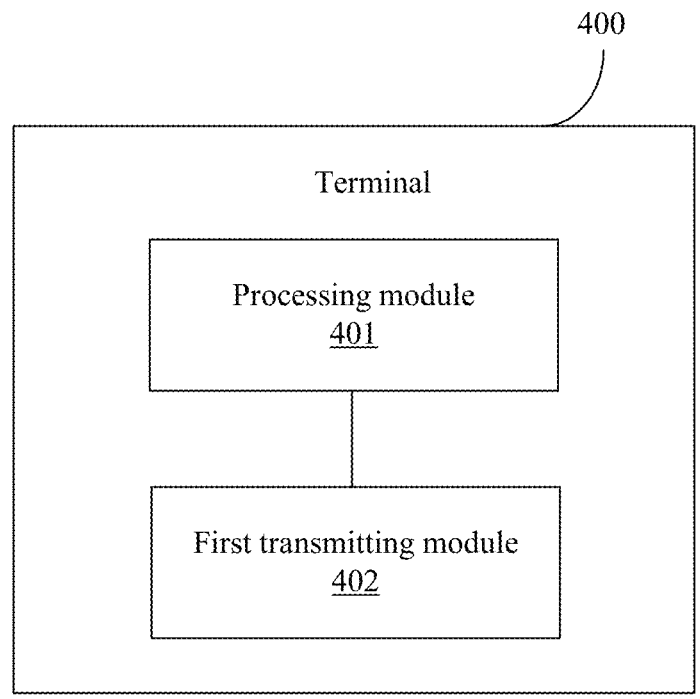
FIG. 4 is a first schematic diagram of a terminal according to some embodiments of the present disclosure.

Referring to FIG. 4, some embodiments of the present disclosure further provide a terminal. The terminal 400 includes:
a processing module 401, configured to discard the first resource when the first resource conflicts with the second resource and/or indicate the reason why the terminal discards the first resource;
a first transmitting module 402, configured to transmit first information to a network device, wherein the first information indicates the terminal to discard the first resource,
the first resource is a resource acquired by the terminal based on a network device scheduling mode, and the second resource is a resource acquired by the terminal based on a terminal autonomous selection mode.

In some embodiments of the present disclosure, optionally, the terminal 400 further includes:
a first receiving module, configured to receive second information from the network device, wherein the second information indicates the terminal to operate in the network device scheduling mode and the terminal autonomous selection mode at the same time.

In some embodiments of the present disclosure, optionally, the terminal 400 further includes:

a second receiving module, configured to receive third information from the network device, wherein the third information is used to reconfigure that the terminal works in the network device scheduling mode or the terminal autonomous selection mode, or the third information is used to reconfigure a resource of the terminal working in the network device scheduling mode.

In some embodiments of the present disclosure, optionally, the first transmitting module 402 is further configured to: transmit the first information to the network device through the predefined signaling and/or the dedicated resource.

In some embodiments of the present disclosure, optionally, the format of the predefined signaling may be any one of the followings:

(1) a PUCCH format;
(2) an MAC CE format; or
(3) an RRC format.

In some embodiments of the present disclosure, optionally, in a case that the format of the predefined signaling is the MAC CE format, the predefined signaling further includes: an LCID, wherein the LCID is used to identify the MAC CE format.

In some embodiments of the present disclosure, optionally, the dedicated resource is a resource of an SR.

In some embodiments of the present disclosure, optionally, the first information includes at least one of the followings:

(1) a grant type of the first resource;
(2) fourth information, the fourth information indicating the first resource for retransmission or new transmission;
(3) an HARQ process identifier;
(4) a Destination ID;
(5) a Destination UE ID;
(6) a Destination Group ID; or
(7) time-frequency information of the conflict resource.

In some embodiment of the present disclosure, optionally, in a case that the grant type of the first resource is a configured grant, the first information further includes: a configured grant index of the first resource.

In some embodiment of the present disclosure, optionally, the time-frequency information includes at least one of the followings:

(1) a duration of the conflict resource;
(2) a time-domain position of the conflict resource;
(3) a frequency-domain position of the conflict resource; or
(4) a resource pool identifier of the conflict resource.

The terminal provided in some embodiments of the present disclosure may perform the foregoing method embodiment. An implementation principle and a technical effect of the terminal are similar to those of the method embodiment, and details are not described again in this embodiment.

Some embodiments of the present disclosure further provide a terminal. The principle of solving the problem by the terminal is similar to the processing method in some embodiments of the present disclosure, so the implementation of the terminal may be referenced to the implementation of the method. Repetitions are not provided herein.

Figure 5:
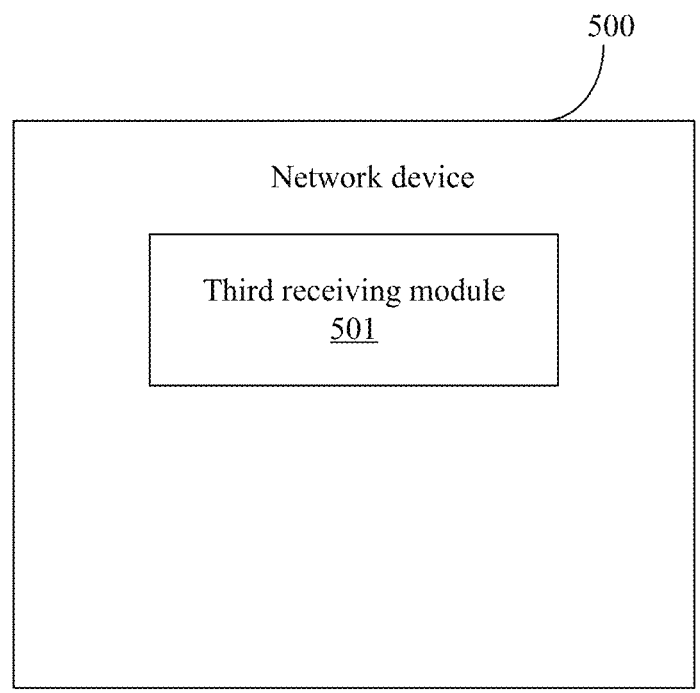
FIG. 5 is a first schematic diagram of a network device according to some embodiments of the present disclosure.

Referring to FIG. 5, some embodiments of the present disclosure further provide a network device. The network device 500 includes:

a third receiving module 501, configured to receive first information from a terminal, wherein the first information indicates that the terminal discards a first resource and/or a reason which the terminal discards the first resource, and the first resource is a resource acquired by the terminal based on a network device scheduling mode.

In some embodiments of the present disclosure, optionally, the network device 500 further includes:

a second transmitting module, configured to transmit second information to the terminal, wherein the second information indicates the terminal to operate in the network device scheduling mode and the terminal autonomous selection mode at the same time.

In some embodiments of the present disclosure, optionally, the network device further includes: a third transmitting module, configured to transmit third information to the terminal, wherein the third information is used to reconfigure that the terminal works in the network device scheduling mode or the terminal autonomous selection mode, or the third information is used to reconfigure a resource of the terminal working in the network device scheduling mode.

In some embodiments of the present disclosure, optionally, the third receiving module 501 is further configured to: transmit the first information to the terminal through the predefined signaling and/or the dedicated resource.

In some embodiments of the present disclosure, optionally, the format of the predefined signaling may be any one of the followings:

(1) a PUCCH format;
(2) an MAC CE format; or
(3) an RRC format.

In some embodiments of the present disclosure, optionally, when the format of the predefined signaling is the MAC CE format, the predefined signaling further includes: an LCID, wherein the LCID is used to identify the MAC CE format.

In some embodiments of the present disclosure, optionally, the dedicated resource is a resource of an SR.

In some embodiments of the present disclosure, optionally, the first information includes at least one of the followings:

(1) a grant type of the first resource;
(2) fourth information, the fourth information indicating the first resource for retransmission or new transmission;
(3) an HARQ process identifier;
(4) a Destination ID;
(5) a Destination UE ID;
(6) a Destination Group ID; or
(7) time-frequency information of a conflict resource.

In some embodiment of the present disclosure, optionally, in a case that the grant type of the first resource is a configured grant, the first information further includes: a configured grant index of the first resource.

In some embodiment of the present disclosure, optionally, the time-frequency information includes at least one of the followings:

(1) a duration of the conflict resource;
(2) a time-domain position of the conflict resource;
(3) a frequency-domain position of the conflict resource; or
(4) a resource pool identifier of the conflict resource.

The network device provided in some embodiments of the present disclosure may perform the foregoing method embodiments, and implementation principles and technical effects thereof are similar. Details are not described herein again in this embodiment.

Figure 6:
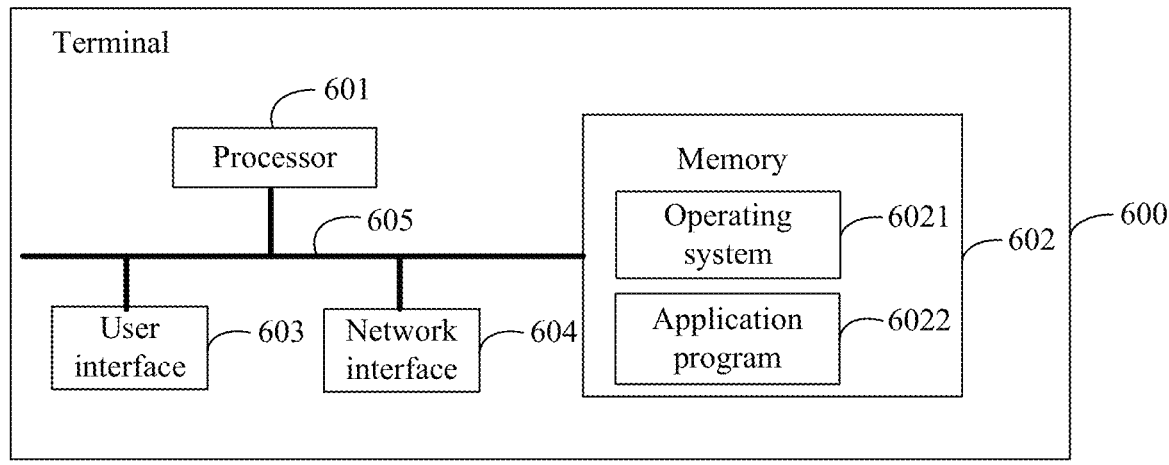
FIG. 6 is a second schematic diagram of a terminal according to some embodiments of the present disclosure.

As shown in FIG. 6, a terminal 600 shown in FIG. 6 includes: at least one processor 601, a memory 602, at least one network interface 604, and a user interface 603. Various components of the terminal 600 are coupled by using a bus system 605. It may be understood that the bus system 605 is used to implement connection communication between these components. In addition to a data bus, the bus system 605 may include a power bus, a control bus, and a status signal bus. However, for clarity of description, various buses are marked as the bus system 605 in FIG. 6.

The user interface 603 may include a display, a keyboard, or a clicking device (for example, a mouse, a trackball, a touch panel, or a touchscreen.

It may be understood that the memory 602 in some embodiments of the present disclosure may be a volatile memory or a nonvolatile memory, or may include both a volatile memory and a nonvolatile memory. The nonvolatile memory may be a read-only memory (Read-only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 602 in the system and the method described in some embodiments of the present disclosure is intended to include, but is not limited to, these memories and memories of any other proper type.

In some implementations, the memory 602 stores the following elements: an executable module or a data structure, or a subset thereof, or an extension set thereof: an operating system 6021 and an application program 6022.

The operating system 6021 includes various system programs, such as a framework layer, a kernel library layer, and a driver layer, and is used to implement various basic services and process hardware-based tasks. The application program 6022 includes various application programs, for example, a media player, a browser, and the like, and is configured to implement various application services. A program for implementing the method in some embodiments of the present disclosure may be included in the application program 6022.

In one embodiment of the present disclosure, by calling a program or instruction stored in the memory 602, specifically, a program or instruction stored in the application program 6022, the following steps are implemented during execution: discarding the first resource when the first resource conflicts with the second resource; and transmitting the first information to the network device, wherein the first information indicates that the terminal discards the first resource and/or a reason why the terminal discards the first resource, the first resource is a resource acquired by the terminal based on a network device scheduling mode, and the second resource is a resource acquired by the terminal based on a terminal autonomous selection mode.

The terminal provided in some embodiments of the present disclosure may perform the foregoing method embodiment. An implementation principle and a technical effect of the terminal are similar to those of the method embodiment, and details are not described again in this embodiment.

Figure 7:
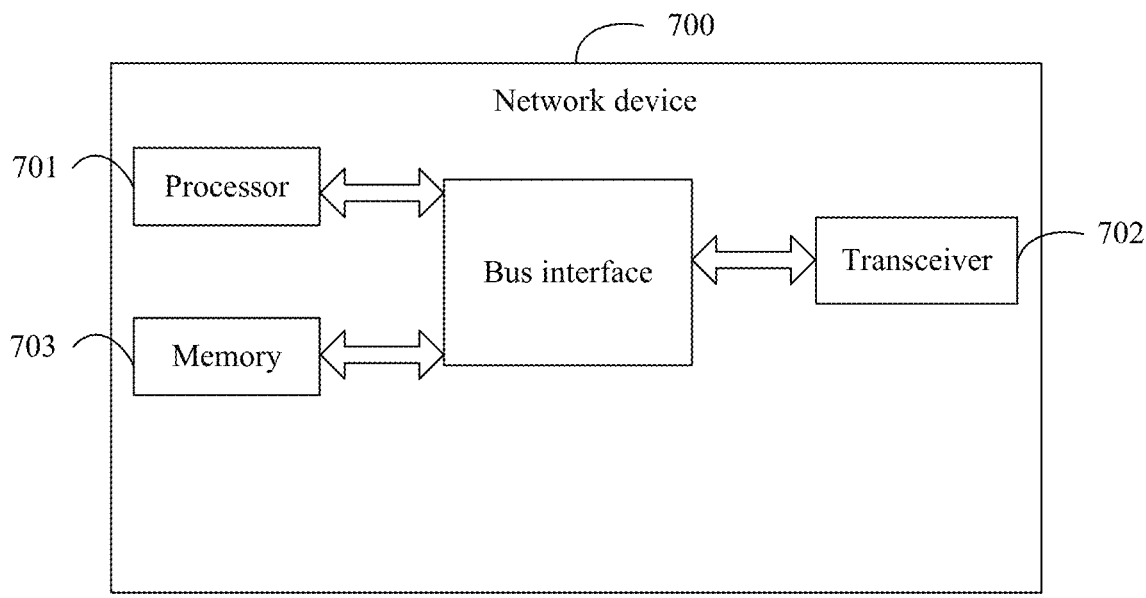
FIG. 7 is a second schematic diagram of a network device according to some embodiments of the present disclosure.

Referring to FIG. 7, FIG. 7 is a structural diagram of a network device applied in some embodiments of the present disclosure. As shown in FIG. 7, the network device 700 includes: a processor 701, a transceiver 702, a memory 703, and a bus interface.

In one embodiment of the present disclosure, the network device 700 further includes: a program stored in the memory 703 and capable of running on the processor 701. When the program is executed by the processor 701, the following steps are implemented: receiving first information from a terminal, wherein the first information indicates that the terminal discards a first resource and/or a reason which the terminal discards the first resource, and the first resource is a resource acquired by the terminal based on a network device scheduling mode.

In FIG. 7, the bus architecture may include any number of interconnected buses and bridges, which are specifically linked together by various circuits of one or more processors represented by the processor 701 and a memory represented by the memory 703. The bus architecture may further link together various other circuits such as peripheral devices, voltage regulators, and power management circuits. These are all known in the art, and therefore, no further description is provided herein. The bus interface provides an interface. The transceiver 702 may be a plurality of elements, in other words, includes a transmitter and a receiver, and provides a unit configured to communicate with various other apparatuses on a transmission medium.

The processor 701 is responsible for bus architecture management and general processing. The memory 703 may store data used by the processor 701 when the processor 701 performs an operation.

The network device provided in some embodiments of the present disclosure may perform the foregoing method embodiments, and implementation principles and technical effects thereof are similar. Details are not described herein again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be carried in an ASIC. In addition, the ASIC may be carried in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may adopt a form of complete hardware embodiments, complete software embodiments, or software-hardware combined embodiments. Moreover, some embodiments of the present disclosure may use a form of a computer program product that is implemented on one or more computer-usable storage media (including but are not limited to a magnetic disk memory, a CD-ROM, an optical memory, and the like) that include computer-usable program code.

It can be understood that those embodiments described in some embodiments of the present disclosure can be implemented with hardware, software, firmware, middleware, microcode, or a combination thereof. For implementation with hardware, the module, unit, and subunit may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present application, or their combinations.

For implementation with software, the technology described in some embodiments of the present disclosure may be implemented by executing functional modules (for example, a process and a function) described in some embodiments of the present disclosure. Software codes can be stored in the memory and executed by the processor. The memory can be implemented inside or outside the processor.

Therefore, the objective of the present disclosure may also be implemented by running a program or a group of programs on any computing apparatus. The computing apparatus may be a well-known general-purpose apparatus. Therefore, the objective of the present disclosure may also be implemented only through providing a program product including a program code capable of implementing the method or device. In other words, such a program product also constitutes the present disclosure, and a storage medium storing such a program product also constitutes the present disclosure. Obviously, the storage medium may be any well-known storage medium or any storage medium to be developed in the future. It should be further noted that, in the device and method of the present disclosure, obviously, various components or various steps may be decomposed and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently.

Some embodiments of the present disclosure are described with reference to the flowcharts and/or block diagrams of the methods, devices (systems), and computer program products according to some embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer-readable memory that can instruct a computer or another programmable data processing device to operate in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to some embodiments of the present disclosure without departing from the spirit and scope of the present disclosure. In this way, the present disclosure is intended to include these modifications and variations of some embodiments of the present disclosure provided that they fall within the scope of the claims of the present disclosure and their equivalent technologies.

The invention claimed is:

1. A processing method, applied to a terminal, comprising:
    discarding a first resource when the first resource conflicts with a second resource; and
    transmitting first information to a network device, wherein the first information indicates that the terminal discards the first resource and a reason why the terminal discards the first resource,
    the first resource is a resource acquired by the terminal based on a network device scheduling mode, and the second resource is a resource acquired by the terminal based on a terminal autonomous selection mode;
    wherein the first information comprises at least one of the followings:
    fourth information, the fourth information indicating the first resource for retransmission or new transmission;
    a hybrid automatic repeat request HARQ process identifier;
    a destination group identifier Destination Group ID; or
    time-frequency information of a conflict resource.

2. The method according to claim 1, before the step of discarding the first resource, the method further comprising:
receiving second information from the network device, wherein the second information indicates the terminal to operate in the network device scheduling mode and the terminal autonomous selection mode at the same time.

3. The method according to claim 1, after the step of transmitting the first information to the network device, the method further comprising:
receiving third information from the network device,
wherein the third information is used to reconfigure that the terminal works in the network device scheduling mode or the terminal autonomous selection mode, or the third information is used to reconfigure a resource of the terminal working in the network device scheduling mode.

4. The method according to claim 1, wherein the step of transmitting the first information to the network device further comprises:
transmitting the first information to the network device through a dedicated resource.

5. The method according to claim 4, wherein the format of the predefined signaling is any one of the followings:
a physical uplink control channel PUCCH format;
a medium access control control element MAC CE format; or
a radio resource control RRC format.

6. The method according to claim 4, wherein in a case that the format of the predefined signaling is the MAC CE format, the predefined signaling further comprises: a logical channel identifier LCID, the LCID being used to identify the MAC CE format; and/or
wherein the dedicated resource is a resource of a scheduling request SR.

7. The method according to claim 1, wherein the first information further comprises:
a grant type of the first resource.

8. The method according to claim 7, wherein in a case that the grant type of the first resource is a configured grant, the first information further comprises: a configured grant index of the first resource.

9. The method according to claim 7, wherein the time-frequency information comprises at least one of the followings:
a duration of the conflict resource;
a time-domain position of the conflict resource;
a frequency-domain position of the conflict resource; or
a resource pool identifier of the conflict resource.

10. A computer readable storage medium, storing a computer program, wherein when the computer program is executed by the processor, the steps of the processing method according to claim 1 are implemented.

11. A processing method, applied to a network device, comprising:
receiving first information from a terminal, wherein the first information indicates that the terminal discards a first resource and a reason why the terminal discards the first resource, and
the first resource is a resource acquired by the terminal based on a network device scheduling mode;
wherein the first information comprises at least one of the followings:
fourth information, the fourth information indicating the first resource for retransmission or new transmission;
a hybrid automatic repeat request HARQ process identifier;
a destination group identifier Destination Group ID; or
time-frequency information of a conflict resource.

12. The method according to claim 11, before the step of receiving the first information from the terminal, the method further comprising:
transmitting second information to the terminal, wherein the second information indicates the terminal to operate in the network device scheduling mode and the terminal autonomous selection mode at the same time.

13. The method according to claim 11, after the step of receiving the first information from the terminal, the method further comprising:
transmitting third information to the terminal,
wherein the third information is used to reconfigure that the terminal works in the network device scheduling mode or the terminal autonomous selection mode, or the third information is used to reconfigure a resource of the terminal working in the network device scheduling mode.

14. The method according to claim 11, wherein the step of receiving the first information from the terminal further comprises:
receiving the first information from the terminal through a dedicated resource.

15. The method according to claim 14, wherein the format of the predefined signaling is any one of the followings:
a PUCCH format;
an MAC CE format; or
an RRC format.

16. The method according to claim 14, wherein when the format of the predefined signaling is the MAC CE format, the predefined signaling further comprises: an LCID, the LCID being used to identify the MAC CE format; and/or
wherein the dedicated resource is a resource of an SR.

17. The method according to claim 12, wherein the first information further comprises:
a grant type of the first resource.

18. The method according to claim 17, wherein in a case that the grant type of the first resource is a configured grant, the first information further comprises: a configured grant index of the first resource; and/or
wherein the time-frequency information comprises at least one of the followings:
a duration of the conflict resource;
a time-domain position of the conflict resource;
a frequency-domain position of the conflict resource; or
a resource pool identifier of the conflict resource.

19. A network device, comprising: a processor, a memory, and a program stored in the memory and capable of running on the processor, wherein when the program is executed by the processor, the steps of the processing method according to claim 11 are implemented.

20. A terminal, comprising: a processor, a memory, and a program stored in the memory and capable of running on the processor, wherein the program is executed by the processor to implement:
discarding a first resource when the first resource conflicts with a second resource; and
transmitting first information to a network device, wherein the first information indicates that the terminal discards the first resource and a reason why the terminal discards the first resource,
the first resource is a resource acquired by the terminal based on a network device scheduling mode, and the second resource is a resource acquired by the terminal based on a terminal autonomous selection mode;

wherein the first information comprises at least one of the followings:

fourth information, the fourth information indicating the first resource for retransmission or new transmission;

a hybrid automatic repeat request HARQ process identifier;

a destination group identifier Destination Group ID; or time-frequency information of a conflict resource.

* * * * *